US005791839A

United States Patent [19]

Budert

[11] Patent Number: 5,791,839

[45] Date of Patent: Aug. 11, 1998

[54] TOOL HOLDER FOR DRILL BITS

[75] Inventor: Guenter H. Budert, Bachhagel, Germany

[73] Assignee: Georg Knoblauch, Giegen, Germany

[21] Appl. No.: 940,585

[22] Filed: Sep. 30, 1997

[30] Foreign Application Priority Data

Oct. 23, 1996 [DE] Germany .......................... 29618465 U

[51] Int. Cl.[6] ...................................................... B23B 39/00

[52] U.S. Cl. ..................... 408/241 R; 206/372; 206/373; 206/379; 211/69; 211/170

[58] Field of Search ......................... 408/241 R; 206/372, 206/373, 379; 211/69, 170, 706

[56] References Cited

U.S. PATENT DOCUMENTS

| | | | |
|---|---|---|---|
| 2,043,825 | 7/1936 | Nissenbaum | 206/379 |
| 2,427,218 | 11/1947 | Liebson | 211/69 |
| 2,775,342 | 12/1956 | Smith | 206/379 |
| 3,074,539 | 1/1963 | Rogovin | 206/379 |
| 4,006,821 | 2/1977 | Sautter | 206/379 |
| 4,660,719 | 4/1987 | Peterson et al. | 206/379 |
| 4,720,021 | 1/1988 | Byrns | 206/373 |
| 4,955,478 | 9/1990 | Rau et al. | 206/379 |
| 5,123,532 | 6/1992 | Rau et al. | 206/373 |
| 5,562,208 | 10/1996 | Hasler et al. | 206/373 |

*Primary Examiner*—Daniel W. Howell
*Assistant Examiner*—Adesh Bhargava
*Attorney, Agent, or Firm*—Michael B. McMurry; Kathleen A. Ryan

[57] ABSTRACT

The invention relates to a tool holder with a base part, which has a base plate and a tool-receiving chamber enclosed by side walls, and with a cover. At least one tool-receiving box for elongate tools, in particular drill bits, is arranged in the tool-receiving chamber. The tool-receiving box is arranged for swing action in the tool-receiving chamber such that tools which are located in the tool-receiving box can be pivoted, when the cover is open, from an at least approximately horizontal position into an at least approximately vertical position. At least one curved handle is fastened in an articulated manner on the tool-receiving box for the purpose of executing the swing action of the latter, and a securing device for fixing the tool-receiving box in an at least approximately vertical position is provided on a side wall of the base part.

19 Claims, 2 Drawing Sheets

TOOL HOLDER FOR DRILL BITS

FIELD OF THE INVENTION

The invention relates to a tool holder for elongate tools, in particular drill bits, with a base part and a cover.

BACKGROUND OF THE INVENTION

In the case of a tool holder which is known from practical experience and has a base part and a cover, a tool-receiving box is provided, for receiving drill bits, in a tool-receiving chamber of the base part and is arranged for swing action in the base part, the region where the tool-receiving box can swing out of an approximately horizontal position into an approximately vertical position being delimited by a stop. A tool holder of this kind makes it possible to store drill bits in a space-saving manner and to remove the tools easily from the tool-receiving box since the latter can be swung into an approximately vertical position.

However, the disadvantage with this known tool holder is that the tool-receiving box with the drill bits contained therein cannot assume a stable vertical position and thus swings back again, of its own accord, into an approximately horizontal position, which is not advantageous for tool removal.

A further disadvantage of the known solution is that the user can only execute the swing action of the tool-receiving box with difficulty since, since said box is filled with tools, the surface area where it can be gripped is very restricted.

SUMMARY OF THE INVENTION

The object of the present invention is to provide a tool holder for elongate tools, in particular drill bits, of the type mentioned in the introduction, which, in addition to space-saving tool storage, permits straightforward removal of a specific tool and ensures a high degree of stability, even in the case of heavy tools.

This object is achieved according to the invention by the features specified in claim 1.

In addition to straightforward swing-open action of the tool-receiving box by means of the curved handle, the configuration according to the invention has the advantage that the tool-receiving box with the tools can be fixed in an at least approximately vertical position via the curved handle and the securing device on the side wall of the base part. Consequently, the tool-receiving box can be positioned in an approximately vertical position for a long period of time, and the situation where said box swings back in an undesired manner of its own accord into a horizontal position is ruled out, even in the case of the tool-receiving box being filled with heavy or very long tools.

BRIEF DESCRIPTION OF THE DRAWINGS

Further advantages and advantageous developments and configurations of the invention can be gathered from the subclaims and from the exemplary embodiment, the principles of which are described hereinbelow with reference to the drawing, in which:

DETAILED DESCRIPTION

Figure 1:
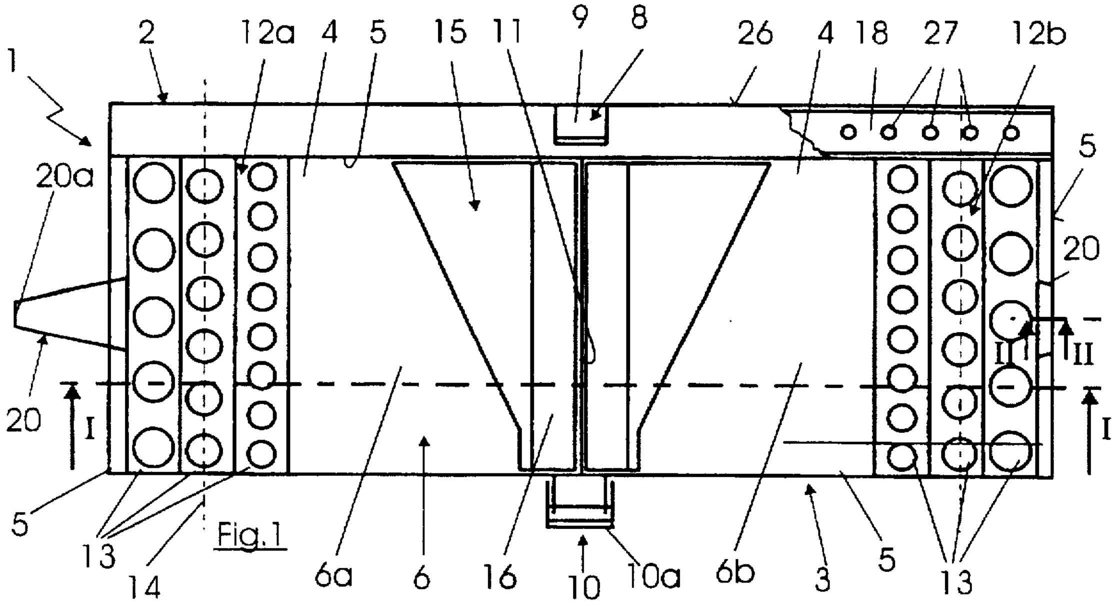
FIG. 1 shows a plan view of a tool holder with open cover, the tool holder having two tool-receiving boxes with in each case three tool-receiving compartments and has in each one curved handle and one securing device.
Figure 2:
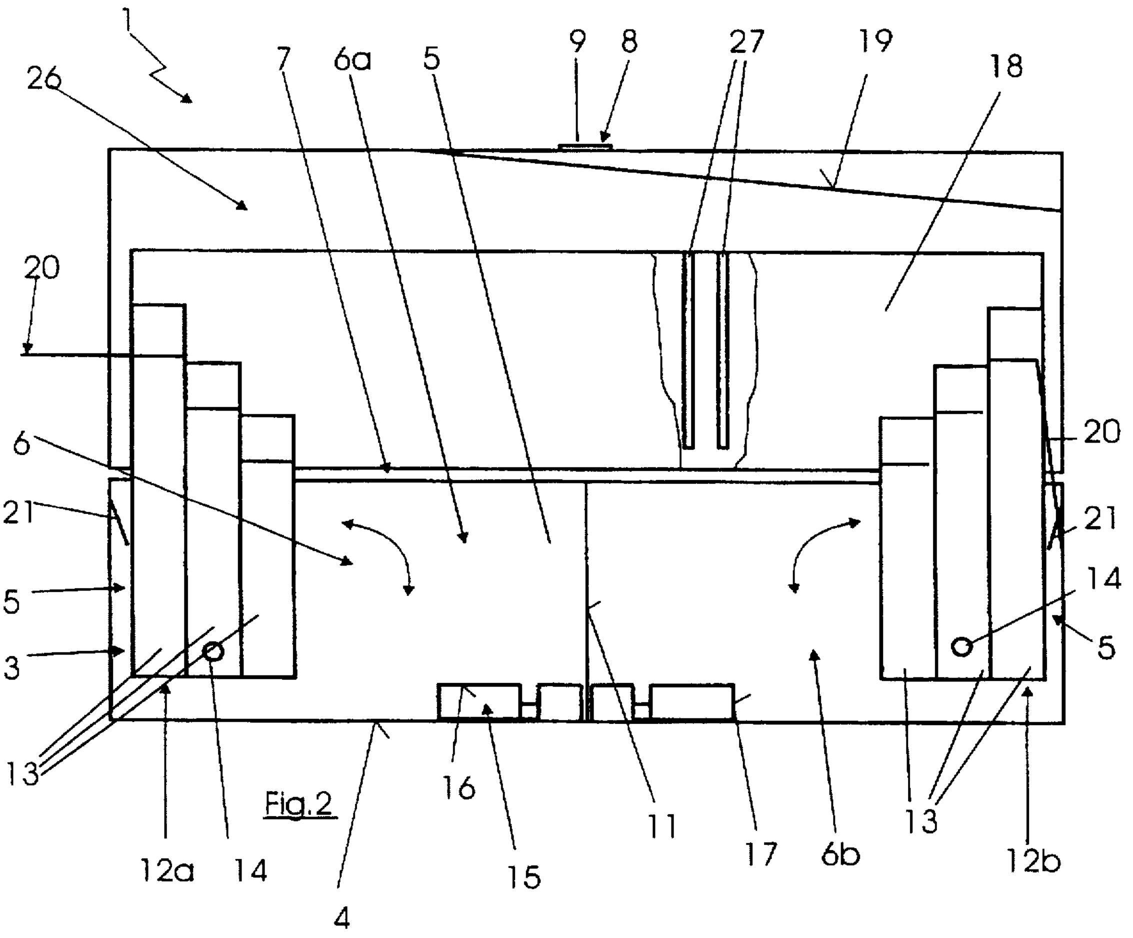
FIG. 2 shows a side view of the tool holder with open cover, in section along line I—I according to FIG. 1.

FIGS. 1 and 2 show a tool holder 1 for elongate tools (not illustrated in the drawing), in particular for drill bits, with a cover 2 and a base part 3 which is designed with a base plate 4 and a tool-receiving chamber 6 enclosed by four side walls 5.

The cover 2 and the base part 3 are connected to one another along a longitudinal side by means of a hinge device 7. A closure device 8 is arranged on that longitudinal side of the base part 3 which is located opposite the hinge device 7, a closure hook 9 being fastened on the cover 2 and a clamping device 10 being fastened on the outside of the side wall 5 of the base part 3. When the cover 2 is closed, the clamping device 10 is inserted into the closure hook 9 and braced by a lever 10*a* of the clamping device 10 until the latter latches in a stable position. It is thus ensured that the tool holder 1 does not open of its own accord during transportation and the tools cannot drop out of the tool holder 1 as a result.

In the present exemplary embodiment, the tool-receiving chamber 6 is designed by two mirror-inverted tool-receiving chambers 6*a*, 6*b* which are located opposite one another and are separated by a crosspiece 11. In each case one tool-receiving box 12*a*, 12*b* is located in the tool-receiving chambers 6*a*, 6*b*, and these boxes are arranged in parallel on a common rotary pin 14 such that, when the tool-receiving boxes 12*a*, 12*b* are swung open out of a horizontal position into a vertical position, the tool-receiving compartments 13, in a swung-open state, are located in a fan-like manner and approximately vertically one beside the other, the tool-receiving compartments 13 enclosing an angle with respect to one another with the rotary pins 14 as line of intersection. Additionally arranged in the tool-receiving chambers 6*a*, 6*b* is a base insert 15 which has a bearing surface 16 and a stop surface 17 for tools which are located in the tool-receiving boxes 12*a*, 12*b*. When the tool holder 1 is closed, the base insert 15 fixes the tools in the tool-receiving boxes 12*a*, 12*b*. This ensures, during transportation or if the tool holder 1 should be subject to vibration, that the tools do not drop out of the tool-receiving boxes 12*a*, 12*b* and, for example, the sensitive drill-bit flanks are not damaged by impact.

Arranged in the cover 2 is a tool-receiving strip 18 with tool-receiving shafts 27 contained therein. In particular, the cover 2 includes a bottom plate 26 and the tool receiving strip 18 is pivotably arranged in the cover 2 so that when the cover 2 is open, as shown in FIGS. 1 and 2, the tool receiving strip 18 encloses an angle with the bottom plate 26 of the cover. Consequently, it is possible, when the tool holder 1 is open, for the tool-receiving strip to be swung forwards out of the cover 2 such that the swing-open action of the tool-receiving boxes 12*a*, 12*b* is not obstructed. A stop strip 19 is also provided in the cover 6, perpendicularly with respect to the bottom plate 26, and is used for fixing the tools in the toll-receiving strip 18. The stop strip 19 thus Runs obliquely in the cover 2 and provides means by which the tools which are located in the tool-receiving strip 18 are fixed in the latter and remain in the tool-receiving shafts 27 during transportation or if they are subject to vibration. This rules out damage to sensitive tool parts. The oblique arrangement of the stop strip 19 in the cover 2 takes into account the arrangement in the tool-receiving strip 18 of tools of different lengths which are graded in said strip in accordance with thickness and length. The tool-receiving strip 18 further increases the capacity of the tool holder 1 for elongate tools, in particular drill bits, as a result of which, in an extremely small amount of space, the user is provided with a very comprehensive range of a wide variety of drill-bit sizes.

In order to be able to pivot the tool-receiving boxes 12*a*, 12*b* more easily out of the base part 3, the curved handle 20 is fastened in an articulated manner in each case on a tool-receiving box 12*a*, 12*b*. This articulated connection is configured such that two metal-plate lugs (not illustrated) are provided on the tool-receiving box 12*a*, 12*b* and have the curved handle 20 fastened thereon. The curved handle 20 consists of a wire which is bent in the form of a trapezium, the shorter length of the trapezium forming a grip piece 20*a* and the long length parallel thereto being connected in a hinge-like manner to the tool-receiving box 12*a* or 12*b*. On the freely extending sides of the trapezium, the wire is bent so as to form, at the end of the curved handle 20, two eyelets (not illustrated) which, between the metal-plate lugs, are guided over the latter and rest against the connection to the tool-receiving box 12*a*, 12*b*. In this arrangement, the curved handle 20 is subjected to prestressing and, on the one hand, a releasable and rotatable connection is obtained between the curved handle 20 and the tool-receiving box 12*a*, 12*b* and, on the other hand, this arrangement means that it is no longer possible for the curved handle 20 to be released of its own accord from the metal-plate lugs.

Figure 3:
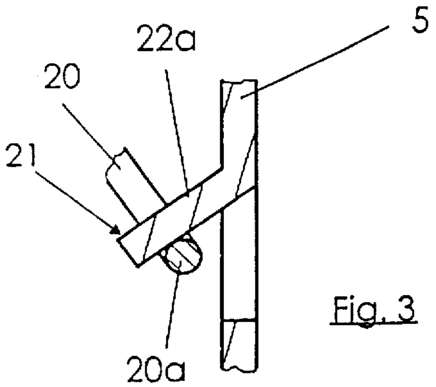
FIG. 3 shows an enlarged illustration of a securing device arranged on a side wall of a base part of the tool holder, in section along line II—II in FIG. 1.

FIG. 3 illustrates a securing device 21 by means of which the tool-receiving boxes 12*a*, 12*b* can be fastened on the side wall 5 of the base part 3 via the curved handle 20. The securing device 21 is designed as a lug 22*a* which protrudes in the direction of the base plate 4 of the base part 3 such that, in an approximately vertical position of the tool-receiving box 12*a*, 12*b*, the curved handle 20 can be guided over said lug 22*a* and inserted therein. The lug 22*a* is stamped out of the side wall. There is no need for any additional outlay in terms of material in this design variant.

Figure 4:
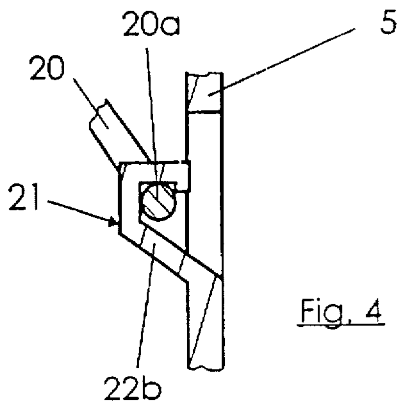
FIG. 4 shows a cross section of a further embodiment of the securing device.

As an alternative, FIG. 4 illustrates a securing device 21 which, in the same way as the lug 22*a* according to FIG. 3, is stamped out of the side wall. The difference is that the lug 22*b* protrudes, into the tool-receiving chamber, in the direction of the cover and, at the free end facing the cover, has a hook-like bent section into which the curved handle can be inserted.

Figure 5:
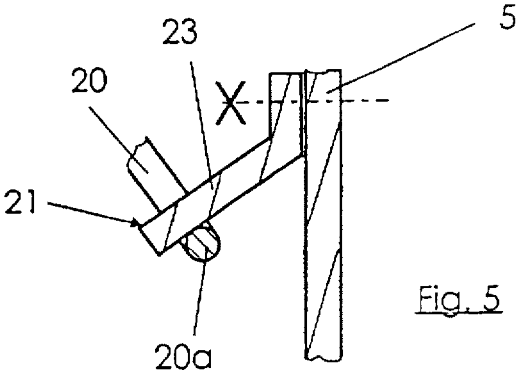
FIG. 5 shows a cross section of a further embodiment of the securing device, this time designed as a metal-plate element.

As an alternative, FIG. 5 illustrates a securing device 21 which is designed as a metal-plate element 23 which is fastened on the side wall 5 of the base part 3. The connection may expediently take place using various methods, e.g. soldering, spot welding, adhesive bonding, riveting or the like.

Figure 6:
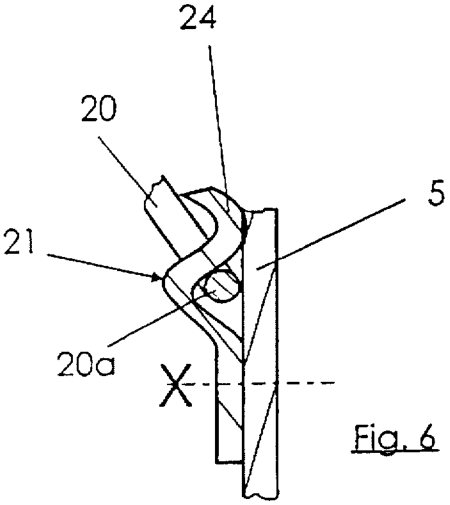
FIG. 6 shows a cross section of a further embodiment of the securing device, this time designed as a metal spring plate.

As an alternative to the designs shown in FIGS. 3 and 4, the securing device 21 in FIG. 6 is realized by a metal spring plate 24 which, just as the metal-plate element 23 in FIG. 4, can be fastened on the side wall 5 in various ways. In this case, the curved handle 20 is displaced under pressure through the gap between the side wall 5 of the base part 3 and the stressed metal spring plate 24. The metal spring plate 24 closes the gap once the curved handle 20 has been introduced into an interspace between the side wall 5 and metal spring plate 24, said interspace being provided by the special design of said metal spring plate 24. The curved handle 20 is thus clamped securely between the metal spring plate 24 and the side wall 5, and the tool-receiving box 12*a*, 12*b* is fixed in the approximately vertical position.

Figure 7:
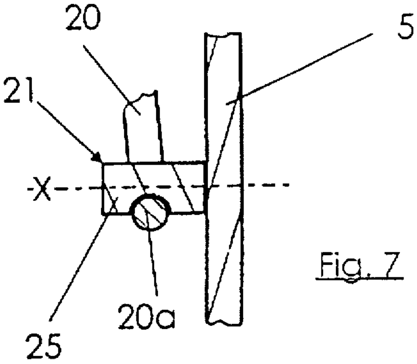
FIG. 7 shows a cross section of a further embodiment of the securing device, this time designed as a hook.

As a further embodiment of the securing device 21, FIG. 7 illustrates a hook 25. On the side facing the base plate 4 of the base part 3, said hook 25 has a notch in which the curved handle can be latched.

I claim:

1. A tool holder for elongate tools, in particular drill bits, comprising:

a cover, and a base part having a base plate and a first tool-receiving chamber, said tool-receiving chamber being enclosed by four side walls;

a first tool-receiving box being arranged for swing action in said tool-receiving chamber such that tools which are located in said tool-receiving box can be pivoted, when said cover is open, from an approximately horizontal position into an approximately vertical position;

a curved handle fastened in an articulated manner on said tool-receiving box for the purpose of executing the swing action of said tool-receiving box; and a securing device provided on one of said four side walls, said securing device fixing said tool-receiving box in the approximately vertical position.

2. The tool holder as claimed in claim 1, wherein said securing device is a lug which protrudes into said tool-receiving chamber in the direction of said base plate such that said curved handle can be guided over said lug and inserted therein when said tool-receiving box in is the approximately vertical position.

3. The tool holder as claimed in claim 2, wherein said lug is stamped out of said one of said four side walls.

4. The tool holder as claimed in claim 2, wherein said lug is a metal-plate element which is fastened in said tool-receiving chamber on said one of said four side walls.

5. The tool holder as claimed in claim 1, wherein said securing device is a lug which protrudes into said tool-receiving chamber in the direction of said cover such that said curved handle can be guided over said lug and inserted therein when said tool-receiving box is in the approximately vertical position.

6. The tool holder as claimed in claim 5, wherein said lug is stamped out of said one of said four side walls.

7. The tool holder as claimed in claim 1, wherein said securing device is a metal spring plate which is fastened on said one of said four side walls.

8. The tool holder as claimed in claim 1, wherein said securing device is a hook provided on said one of said four side walls, said hook having, on a side facing said base plate, a notch into which said curved handle can be latched.

9. The tool holder as claimed in claim 1, wherein said base part and said cover are connected to one another by means of a hinge device.

10. The tool holder as claimed in claim 1, wherein a closure device is provided between said base part and said cover.

11. The tool holder as claimed in claimed in claim 10, wherein said tool-receiving box includes at least two tool-receiving compartments arranged in parallel with a common rotary pin.

12. The tool holder as claimed in claim 11, wherein said at least two tool-receiving compartments are arranged in a fan-like manner such that they enclose an angle with the rotary pin as line of intersection when said tool-receiving box is in the approximately vertical position.

13. The tool holder as claimed in claim 1, wherein said tool-receiving box is mounted in said tool-receiving chamber along a rotary pin which extends between an opposing two of said four side walls.

14. The tool holder as claimed in claim 1, wherein said base part further includes a second tool-receiving chamber, a second tool-receiving box, and a cross piece, said first and second tool-receiving chambers being separated by said cross piece, said first tool receiving box being arranged in said first tool-receiving chamber and said second tool-receiving box being arranged in said second tool-receiving chamber.

15. The tool holder as claimed in claim 14, wherein said two tool-receiving chambers are arranged in a mirror-inverted manner.

16. The tool holder as claimed in claim 1, wherein a base insert having a bearing surface and a stop surface is arranged on said base plate, said stop surface being formed perpendicularly to said bearing surface and intended for tools which are located in said tool-receiving box.

17. The tool holder as claimed in claim 1, wherein a tool-receiving strip with tool-receiving shafts contained therein is arranged in said cover.

18. The tool holder as claimed in claim 17, wherein said cover includes a bottom plate and wherein said tool-receiving strip is arranged pivotably in said cover such that, when said cover is open, said strip encloses an angle with said bottom plate.

19. The tool holder as claimed in claim 17, wherein said cover includes a bottom plate and wherein a stop strip is provided in said cover perpendicularly with respect to said bottom plate, and is used for fixing the tools in said tool-receiving strip.

* * * * *